United States Patent
Kang et al.

(10) Patent No.: US 7,595,132 B2
(45) Date of Patent: Sep. 29, 2009

(54) BATTERY HAVING SPECIFIC PACKAGE STRUCTURE

(75) Inventors: Hee Gyoung Kang, Cheonan-si (KR); Hyang Mok Lee, Seoul (KR); Oh Young Hyun, Daejeon (KR); Chang bum Ahn, Daejeon (KR); Sung-Min Hwang, Seoul (KR)

(73) Assignee: LG Chem, Ltd. (KR)

( * ) Notice: Subject to any disclaimer, the term of this patent is extended or adjusted under 35 U.S.C. 154(b) by 877 days.

(21) Appl. No.: 11/044,757

(22) Filed: Jan. 27, 2005

(65) Prior Publication Data

US 2005/0191549 A1    Sep. 1, 2005

(30) Foreign Application Priority Data

Jan. 30, 2004    (KR) ............... 10-2004-0006104
Oct. 12, 2004    (KR) ............... 10-2004-0081532

(51) Int. Cl.
*H01M 2/08*    (2006.01)
*H01M 6/46*    (2006.01)
*H01M 2/00*    (2006.01)
*H01M 2/04*    (2006.01)
*H01M 2/10*    (2006.01)

(52) U.S. Cl. ............... 429/185; 429/162; 429/163; 429/175; 429/176; 429/186

(58) Field of Classification Search ........ 429/162, 429/163
See application file for complete search history.

(56) References Cited

U.S. PATENT DOCUMENTS

| | | | | |
|---|---|---|---|---|
| 5,586,716 | A | * | 12/1996 | Correll ............... 229/110 |
| 6,242,131 | B1 | * | 6/2001 | Noh ............... 429/185 |
| 2003/0031923 | A1 | * | 2/2003 | Aoshima et al. ............... 429/127 |
| 2005/0084749 | A1 | * | 4/2005 | Hwang et al. ............... 429/127 |

* cited by examiner

*Primary Examiner*—Dah-Wei D Yuan
*Assistant Examiner*—Adam A Arciero
(74) *Attorney, Agent, or Firm*—Cantor Colburn LLP

(57) ABSTRACT

The present invention provides a battery having a structure for increasing the power storage capacity and output thereof In accordance with the present invention, in a battery comprising an electrode assembly including anode plates, cathode plates and separators; and a battery case, both side bonding portions of which are folded toward adjacent sides thereof, for accommodating the electrode assembly and a designated amount of electrolyte, and sealing the electrode assembly such that two electrode terminals connected to corresponding electrode taps of the anode and cathode plates of the electrode assembly are exposed to the outside, an upper bonding portion of the battery case is folded toward the upper end of the battery case, and/or common portions of the upper bonding portion and both side portions of the battery case are cut off, and/or inner corners corresponding to the upper bonding portion have larger radiuses of curvature, and/or receipt portions for receiving the electrode assembly are respectively formed in upper and lower bodies of the battery case. The battery having the above structure has high power storage capacity and output at the same size of the battery package, and high sealing capacity and safety.

8 Claims, 9 Drawing Sheets

☒ --- Bonding portion

BATTERY HAVING SPECIFIC PACKAGE STRUCTURE

BACKGROUND OF THE INVENTION

The present invention relates to a battery having a package structure for increasing the power storage capacity and output thereof, and more particularly to a battery, in which an upper bonding portion is folded toward the upper end of a battery case to increase the lengths of the battery case and an electrode assembly accommodated in the battery case in proportion to the reduced width of the bonding portion in a longitudinal direction to increase the power storage capacity and output of the battery at the same size of the battery package, and preferably, in which the inner corners corresponding to the upper bonding portion have large radiuses of curvature to provide excellent sealing capacity, and more preferably, in which upper and lower bodies of the battery case are separated from each other and receipt portions for receiving the electrode assembly are respectively formed in the upper and lower bodies to further improve the power storage capacity and output of the battery.

As shown in FIGS. 1A to 1E, a lithium ion polymer battery 10 comprises an electrode assembly 20, including an anode, a cathode, and a separator placed between the anode and the cathode, and a battery case 30 for receiving the electrode assembly 20 and a designated amount of electrolyte and hermetically sealing two electrode terminals 40 connected to corresponding taps of the anode and cathode of the electrode assembly 20 so that the two electrode terminals are exposed to the outside.

The battery case 30 includes a lower body 32 having a receipt portion 30a for containing an electrode assembly 20 and the designated amount of electrolyte, and an upper body 34, serving as a case cover, integrally connected to the lower end of the lower body 32. An extended portion having a designated width is formed along both sides and upper ends of the lower and upper bodies 32 and 34, thereby being used to bond the lower and upper bodies 32 and 34 to each other.

Hereinafter, with reference to FIGS. 1 to 5, an assembly process of the conventional lithium ion polymer battery 10 having the above-described package structure will be described in detail.

First, the electrode terminals 40 are connected to the corresponding taps of the anode and cathodes of the electrode assembly 20 by ultrasonic welding or spot welding. The electrode assembly 20 is placed in the receipt portion 30a of the lower body 32, and a designated amount of electrolyte is injected into the receipt portion 30a. The upper body 34 is covered on the lower body 32 such that the two electrode terminals 40 are exposed to the outside. The extended portions of the lower and upper bodies 32 and 34 contact each other and are pressingly heated using a thermal welding machine (not shown), thereby producing an upper bonding portion 30' and side bonding portions 30" of the battery case 30.

Thereafter, the side bonding portions 30" of the lower and upper bodies 32 and 34 of the battery case 30 are folded at a right angle toward the neighboring sides of the battery case 30. A protection circuit 50 is placed on the upper bonding portion 30' of the battery case 30 in the longitudinal direction of the battery case 30 so that the electrode terminals 40 are connected to corresponding portions of the protection circuit 50 (with reference to FIG. 5).

Since the length of the conventional battery having the above-described structure is limited and the upper bonding portion of the battery case of the conventional battery is extended along the longitudinal direction of the battery case, a component contained in the battery case, i.e., the electrode assembly, has a limited length, thereby decreasing the power storage capacity and the output of the battery.

SUMMARY OF THE INVENTION

Therefore, the present invention has been made in view of the above problems, and it is an object of the present invention to provide a battery having a package structure, in which the lengths of a receipt portion of a battery case and an electrode assembly contained in the receipt portion are increased in proportion to the width occupied by an upper bonding portion of the battery case in the longitudinal direction of the battery case, thereby increasing the power storage capacity and output thereof at the same size of the battery package.

It is a further object of the present invention to provide a battery having a package structure, in which an upper bonding portion of a battery case is easily folded toward the upper end of the battery case and both protruding sides of the upper bonding portion are rounded, thereby preventing a worker from being injured by the protruded sides of the upper bonding portion when the worker handles the battery.

It is another object of the present invention to provide a battery having a package structure, in which, even after common portions of an upper bonding portion and both side portions of a battery case are cut off for folding the upper bonding portion toward the upper end of the battery case, the decompressed state in the battery due to vacuum is maintained by the excellent sealing capacity of the inner corners of an electrode assembly corresponding to the common portions.

It is yet another object of the present invention to provide a battery having a package structure, in which upper and lower bodies of a battery case are separated from each other and receipt portions for receiving an electrode assembly are respectively formed in the upper and lower bodies to increase the thickness of the electrode assembly as well as the length of the electrode assembly, thereby maximizing the power storage capacity and output thereof In accordance with the present invention, the above and other objects can be accomplished by the provision of a battery comprising: an electrode assembly including anode plates, cathode plates, and separators; and a battery case, both side bonding portions of which are folded toward adjacent sides thereof, for accommodating the electrode assembly and a designated amount of electrolyte, and sealing the electrode assembly such that two electrode terminals connected to corresponding electrode taps of the anode and cathode plates of the electrode assembly are exposed to the outside, wherein an upper bonding portion of the battery case is folded toward the upper end of the battery case so that the length of the electrode assembly is increased to improve the power storage capacity and output of the battery, and the two electrode terminals disposed on the upper bonding portion are bent in the longitudinal direction of the battery case.

Preferably, common portions of the upper bonding portion and both side portions of the battery case may be cut off to a designated size. The cut-off size of the common portions are determined by the sizes of the overlapped portions of the upper bonding portion and the side bonding portions when the upper bonding portion is folded toward the upper end of the battery case and the side bonding portions are folded toward both sides of the battery case. Accordingly, where the bonding portions have large sizes, the common portions to be cut off have large sizes also.

The cut-off ends of the common portions of the upper bonding portion and both side portions of the battery case may be rounded, thereby preventing a worker from being injured by the sharpened tips of the cut-off ends of the common portions in an assembly process of the battery.

Preferably, in order to compensate for the widths of the bonding portions decreased by the cut-off of the common portions, inner corners corresponding to the upper bonding portion may have large radiuses of curvature. Since the widths of the common portions, where the upper bonding portion meets with the side bonding portions, are smaller than those of the upper bonding portion and the side bonding portions due to the cut-off of the common portions, the common portions have low sealing capacity.

Since the upper bonding portion is folded to contact the upper end of the battery case, a protection circuit is disposed on the upper end of the battery case such that the rear surface of the protection circuit contacts the upper end. Accordingly, the external length of the battery package provided with the protection circuit installed thereon is smaller than that of the conventional battery package as shown in FIG. 5.

The electrode assembly may be a laminated-type electrode assembly or a jelly rolled-type electrode assembly. Where the inner corners of the battery case have large radiuses of curvature as described above, the ends of the electrode assembly have shapes corresponding to the radiuses of curvature of the inner corners, thereby increasing the capacity of the battery.

The shape and size of the battery case of the battery of the present invention are not limited. Preferably, the battery case may have one structure selected from the group consisting of:

(i) a structure, in which the lower end of an upper body is formed integrally with the lower end of a lower body, and a receipt portion is formed only in the lower body;
(ii) a structure, in which an upper body and a lower body are separated from each other, and a receipt portion is formed in the lower body;
(iii) a structure, in which an upper body and a lower body are separated from each other, and receipt portions are respectively formed in the upper body and the lower body; and
(iv) a structure, in which the lower end of an upper body is formed integrally with the lower end of a lower body, and receipt portions are respectively formed in the upper body and the lower body.

In the structures (ii) and (iii), in which the upper body and the lower body are separated from each other, when the upper and lower bodies are bonded to each other under the condition that the electrode assembly is placed between the upper and lower bodies, sealing bonding portions are required to be formed on the lower end as well as the upper end of the battery case. Further, in the structure (iv), in which the lower end of the upper body is formed integrally with the lower end of the lower body, and the receipt portions are respectively formed in the upper body and the lower body, a bonding portion is also required to be formed on the lower end of the battery case for preventing the receipt portions from being distorted when the upper and lower bodies are folded.

More preferably, the battery case may have the structure (iii) or (iv). In the battery of the present invention, the battery case is mainly made of an aluminum laminate sheet, and processed by deep drawing for forming receipt portions therein. In case where the receipt portions having depths of 5~6 mm or more are obtained by the deep drawing, pinholes or cracks are generated. Accordingly, in order to manufacture a battery having high power storage capacity and output, it is preferable that the battery has a large width. In this case, preferably, the battery has the structure (iii) or (iv), and more preferably, the battery has the structure (iii) in order to improve the easiness in molding the battery and the stability of products.

In case where the lower bonding portion is formed on the lower end of the battery case, in the same manner as the upper bonding portion, the lower bonding portion may have selectively or preferably all of configurations in which (a) common portions where the lower bonding portion meets with both side portions of the battery case are cut off; (b) the cut-off ends of the common portions of the lower bonding portion and both side portions of the battery case are rounded; and (c) inner corners of the electrode assembly corresponding to the lower bonding portion have large radiuses of curvature.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
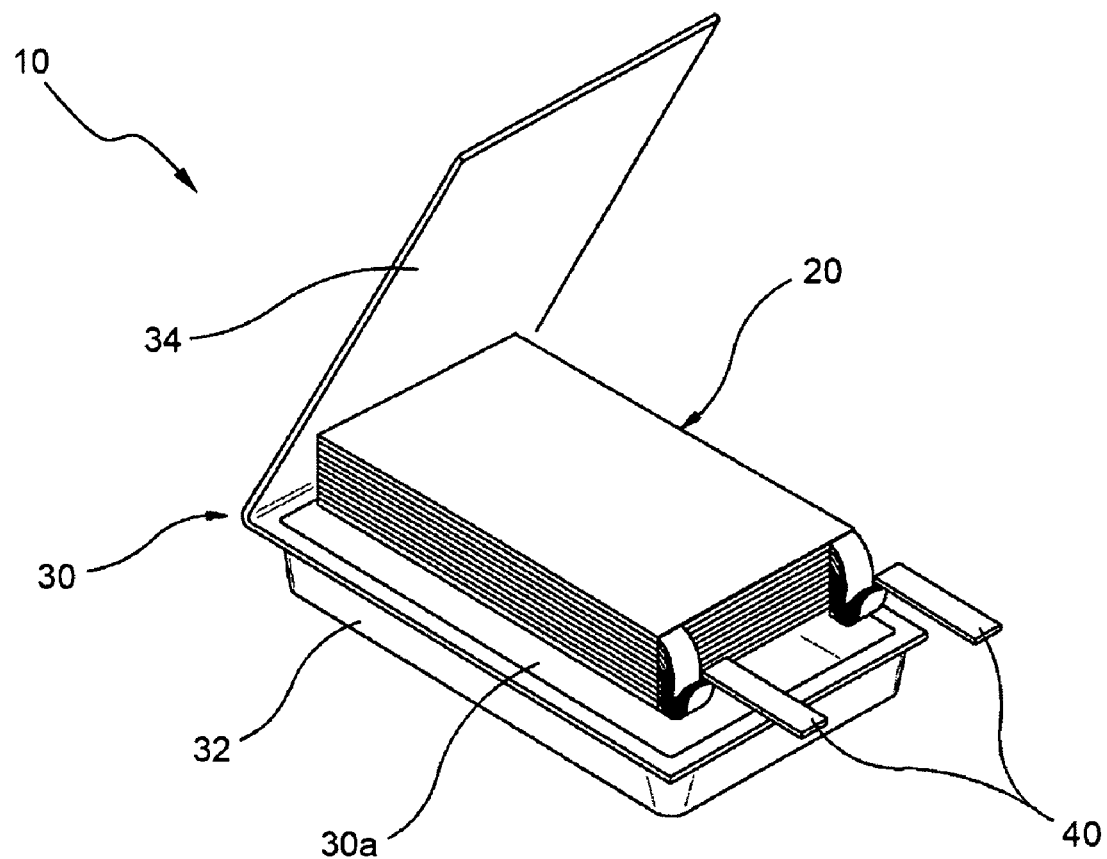
FIGS. 1 to 5 are schematic views of the structure of a conventional battery package.
Figure 2:
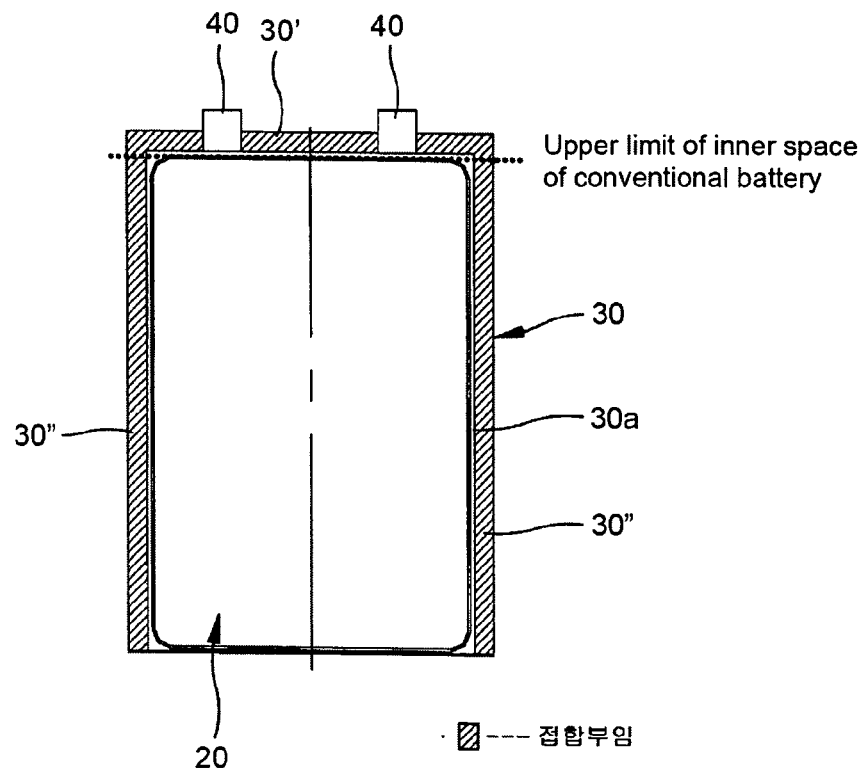

Now, preferred embodiments of the present invention will be described in detail with reference to the annexed drawings.

FIGS. 6 to 10 are schematic perspective and sectional views illustrating the structure and assembly process of a battery package in accordance with one embodiment of the present invention.

Referring to FIGS. 6 to 10, the battery package 100 of this embodiment comprises an electrode assembly 200 including anode plates, cathode plates and separators, and a foldable battery case 300 hermetically sealing two electrode terminals 400 connected to corresponding electrode taps of the anode and cathode plates of the electrode assembly 200 so that the electrode terminals 400 are exposed to the outside, and including a lower body 310 and an upper body 320.

The lower body 310 includes a receipt portion 330 having a concave shape corresponding to the shape of the electrode assembly 200 for receiving the electrode assembly 200 and a designated amount of electrolyte. An upper bonding portion 311 and both side bonding portions 312 are formed along the edge of the receipt portion 330 of the lower body 310.

The upper bonding portion 311 of the battery case 300 is folded toward the upper end of the battery case 300, under the condition that the lower and upper bodies 310 and 320 are bonded to each other, resulting in increasing the length of the electrode assembly 200, thereby increasing the power storage capacity and the output of the battery package 100. The two electrode terminals 400 placed on the upper bonding portion 311 are bent in the longitudinal direction of the battery case 300.

Common portions 340, where the upper bonding portion 311 meets with the side bonding portions 312, are cut off so that the upper bonding portion 311 is easily folded. Accordingly, a process for folding the upper bonding portion 311 and the side bonding portions 312 is easily performed. More preferably, the cut-off ends of the common portions 340 are rounded, thereby preventing a worker handling the battery package 100 from being injured by the sharpened cut-off ends of the common portions 340.

By cutting off the common portions 340, where the upper bonding portion 311 meets with the side bonding portions 312, the cut-off ends of the common portions 340 have comparatively lower sealing capacity compared to the upper bonding portion 311 and the side bonding portions 312. Under normal conditions, decompression of pressure of the electrode assembly 200 due to vacuum is concentrated on the cut-off ends of the common portions 340. In order to solve the above problem, in a preferred embodiment of the present invention, inner upper corners 314 corresponding to the upper bonding portion 311 of the battery case 300 have large radiuses of curvature so as to obtain a large thickness of the bonding portions. That is, the sizes of the bonding portions, which are decreased due to the cut-off of the common portions 340, is compensated for by the inner upper corners 314, thereby having excellent sealing capacity.

Here, the radiuses of curvature of the inner upper corners 314 are larger than those of inner lower corners 315. However, the radiuses of curvature of the inner upper corners 314 are not limited thereto, but may have any value, which satisfies the above conditions. For example, in order to obtain sufficient bonding area around the inner upper corners 314 and properly disperse the pressure applied to the receipt portion of the battery case 300, the radiuses of curvature of the inner upper corners 314 are at least three times those of the inner lower corners 315. The upper limit of the radiuses of curvature of the inner upper corners 314 may have an extremely large value, and the inner surfaces of the inner upper corners 314 may be inclined nearly to a straight line.

In another view, the radiuses of curvature of the inner upper corners 314 are set to a proper value so as to control the stability of the battery assembly 100. Generally, the battery essentially requires a configuration for solving safety problems generated due to improper pressure in the battery. For example, a safety valve, for discharging compressed gas when a cylindrical battery has internal pressure of a critical value or more, is installed in a cap assembly of the cylindrical battery. On the other hand, when the battery having the above-described structure of the present invention has internal pressure of a critical value or more, the bonding portions of the battery case are disassembled, thereby discharging compressed gas therethrough. Accordingly, where the battery having above-described structure of the present invention has internal pressure of a critical value or more, the compressed gas is discharged from the battery to the outside through gaps generated by disassembling the bonding portions, the outer surfaces of which are cut off. In view of the stability of the battery, the configuration of the battery, which discharges the compressed gas through designated portions, provides a battery having high stability. Accordingly, for example, the radiuses of curvature of the inner upper corners 314 are set to a designated range such that the inner upper corners 314 have excellent sealing capacity in the normal operation state of the battery and are disassembled to discharge compressed gas therethrough in the abnormal operation state of the battery caused due to the generation of high internal pressure.

Referring again to FIGS. 6 to 10, a safety element (not shown), such as fuse, bimetal, or PTC, may be attached to the two electrode terminals 400. Preferably, the safety element employs the PCT for intermittently controlling the flow of current of the battery according to temperature. In order to minimize the external length of the battery package, in which a protection circuit 500 is placed on the upper bonding portion 311 folded to contact the upper end of the battery case 300, the protection circuit 500 is disposed in parallel with the upper bonding portion 311 such that the rear surface of the protection circuit 500 contacts the external surface of the upper bonding portion 311 (with reference to FIG. 10).

In case where the upper portion 311 is folded toward the upper end of the battery case 300 under the condition that the common portions 340 are not completely removed, parts of the common portions 340 may be cut off in a diagonal direction or overlapped.

An aluminum sheet is contained in the upper and side bonding portions 311 and 312 as well as the battery case 300, thereby, when the upper bonding portion 311 is folded toward the adjacent upper end of the battery case 300, the folded state of the upper bonding portion 311 is maintained.

The battery package 300 having the above structure as shown in FIGS. 6 to 10 has effects as follows.

First, by folding the side bonding portions 312 toward the corresponding sides of the battery case 300 and folding the upper bonding portion 311 toward the upper end of the battery case 300, it is possible to increase the lengths of the receipt portion 330 of the battery case 300 and the electrode assembly 200 to be contained in the receipt portion 330 in proportion to the width occupied by the upper bonding portion 311 of the battery case 300 in the longitudinal direction of the battery case 300, thereby increasing the power storage capacity and output of the battery at the same size of the battery package.

Second, since the common portions 340 of the upper bonding portion 311 and the side bonding portions 312 of the battery case 300 are cut off, when the upper bonding portion 311 is folded toward the upper end of the battery case 300, the upper bonding portion 311 does not interfere with the side bonding portions 312, thereby being easily folded.

Third, the cut-off portions of the upper bonding portion 311 and the side bonding portions 312, which are obtained by cutting off the common portions 340, are rounded, thereby preventing a worker from being injured by sharpened tips of the cut-off portions.

Fourth, since the radiuses of curvature of the inner upper corners 314 of the battery case 300 are larger than those of the inner lower corners 315, the battery assembly obtains sufficient dimensions of bonding portions around the inner upper corners 314 of the battery case 300, thereby providing high sealing capacity due to uniform dispersion of internal pressure. Further, the radiuses of curvature of the inner upper corners 314 can be set to a proper range so that the compressed gas can be discharged where the internal pressure is more than a critical value, thereby securing high safety.

Figure 11:
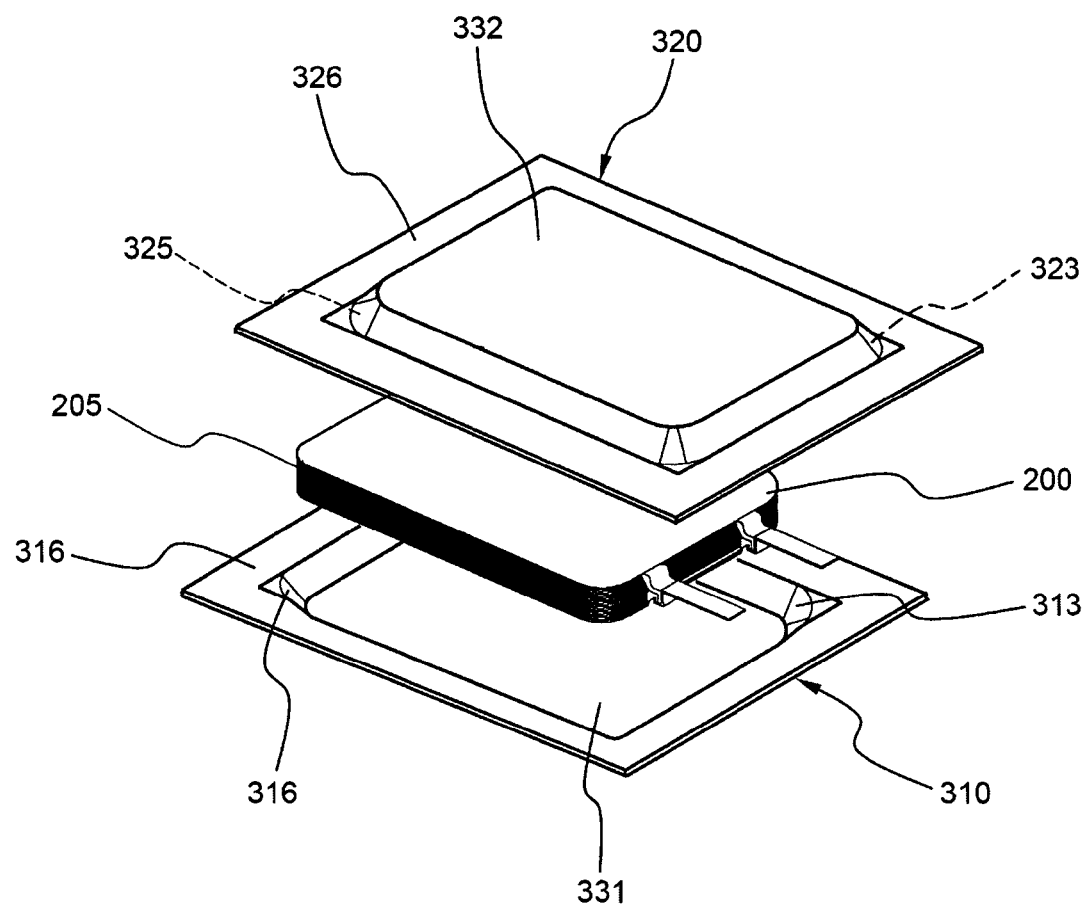
FIGS. 11 to 13 are schematic views of the structure of a battery package in accordance with another embodiment of the present invention.
Figure 12:
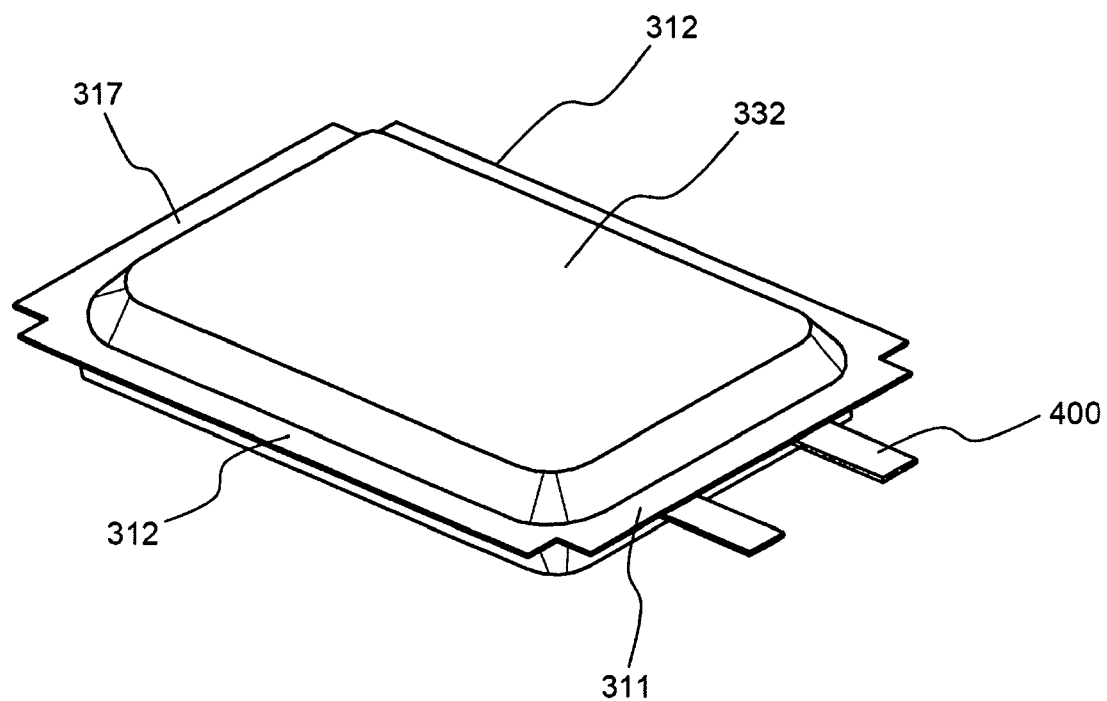
Figure 13:
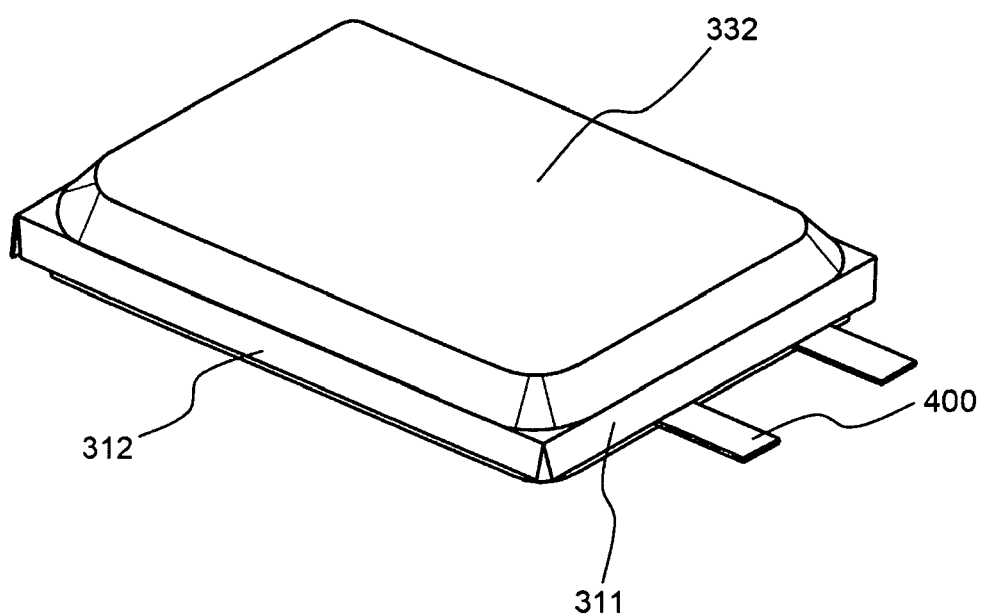

FIGS. 11 to 13 are schematic views of the structure of a battery package in accordance with another embodiment of the present invention.

Figure 3:
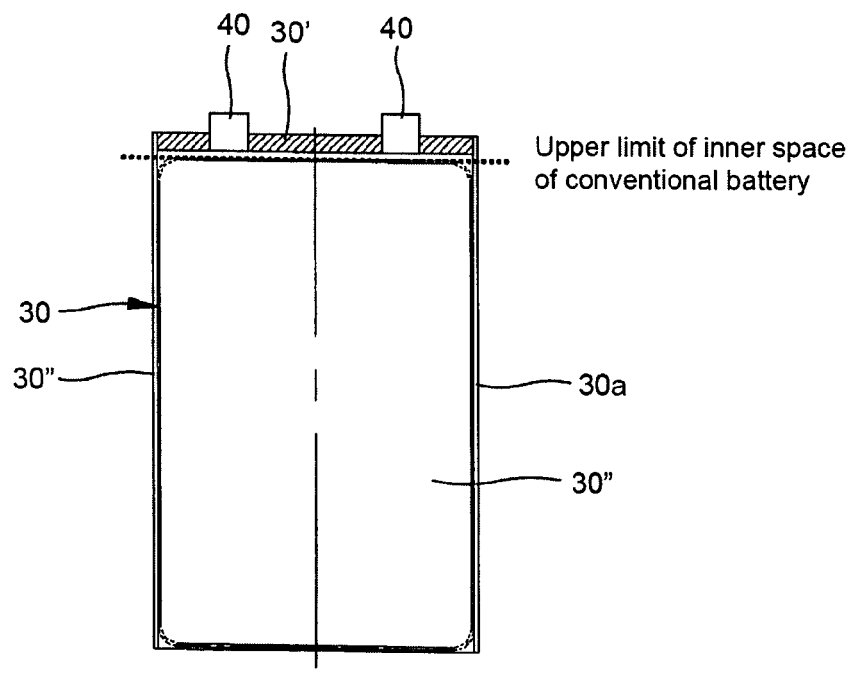
Figure 4:
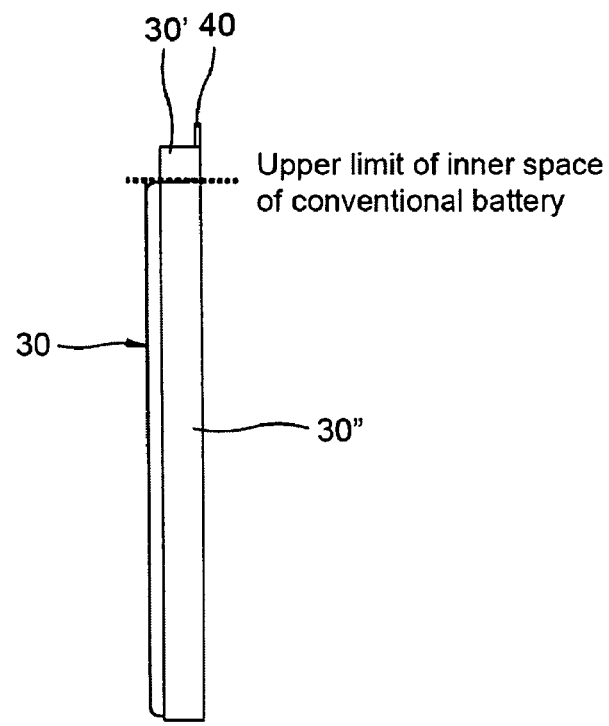
Figure 5:
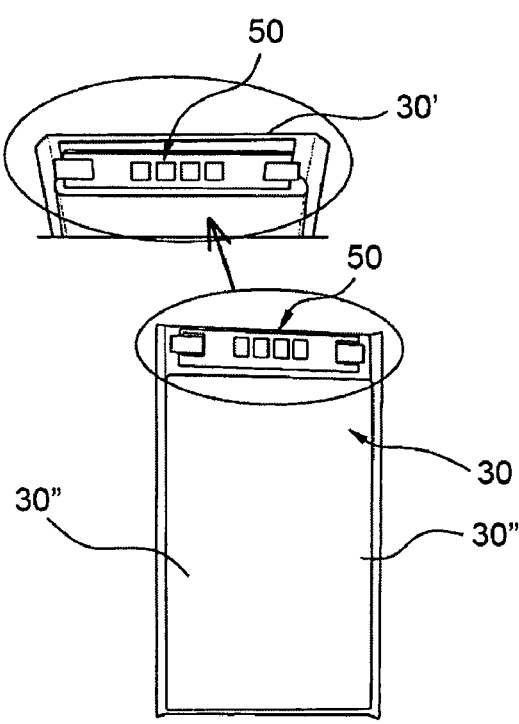

Referring to FIGS. 11 to 13, the battery case 300 includes the lower body 310 and the upper body 320, which are separated from each other, and receipt portions 331 and 332 for receiving the electrode assembly 200 are respectively formed in the lower body 310 and the upper body 320. Extended portions 316 and 326 are extended from the lower ends of the lower body 310 and the upper body 320. When the four extended portions of the lower body 310 and the upper body 320 are thermally fused under the condition that the electrode assembly 200 is contained in the receipt portions 331 and 332, the upper bonding portion 311, the side bonding portions 312, and a lower bonding portion 317 are formed (with reference to FIG. 3B), and the upper bonding portion 311, the side bonding portions 312, and the lower bonding portion 317 are folded respectively toward the upper end, the sides, and the lower end of the battery case 300 (with reference to FIG. 13).

In the same manner as the upper common portions, lower common portions 340, where the lower bonding portion 317 meets with the side bonding portions 312, are cut off. The cut-off of the common portions 340 may be performed at an initial stage for producing the lower body 310 and the upper body 320, or at a step after the thermal fusion of the bonding portions 311, 312, and 317 as shown in FIG. 12.

Inner lower corners 315 and 325 of the lower and upper bodies 310 and 320 corresponding to the lower bonding portion 317 have large radiuses of curvature like the inner upper corners 313 and 323. Both lower ends 205 of the electrode assembly 200 have shapes corresponding to the shapes of the inner lower corners 315 and 325.

As described above, when the battery case 300 is produced by deep drawing, it is difficult to form the receipt portions 331 and 332 having depths of 5~6 mm or more without defect. In case where the receipt portions 331 and 332 are respectively formed in the lower body 310 and upper body 320, as shown in FIG. 11, it is possible to use the battery assembly 400 having a large thickness. The depth of the receipt portion 331 of the lower body 310 need not be the same as that of the receipt portion 332 of the upper body 320. In order to facilitate a battery assembly process, such as easily containing electrolyte, the depth of the receipt portion 331 of the lower body 310 may be larger than that of the receipt portion 332 of the upper body 320.

Figure 14:
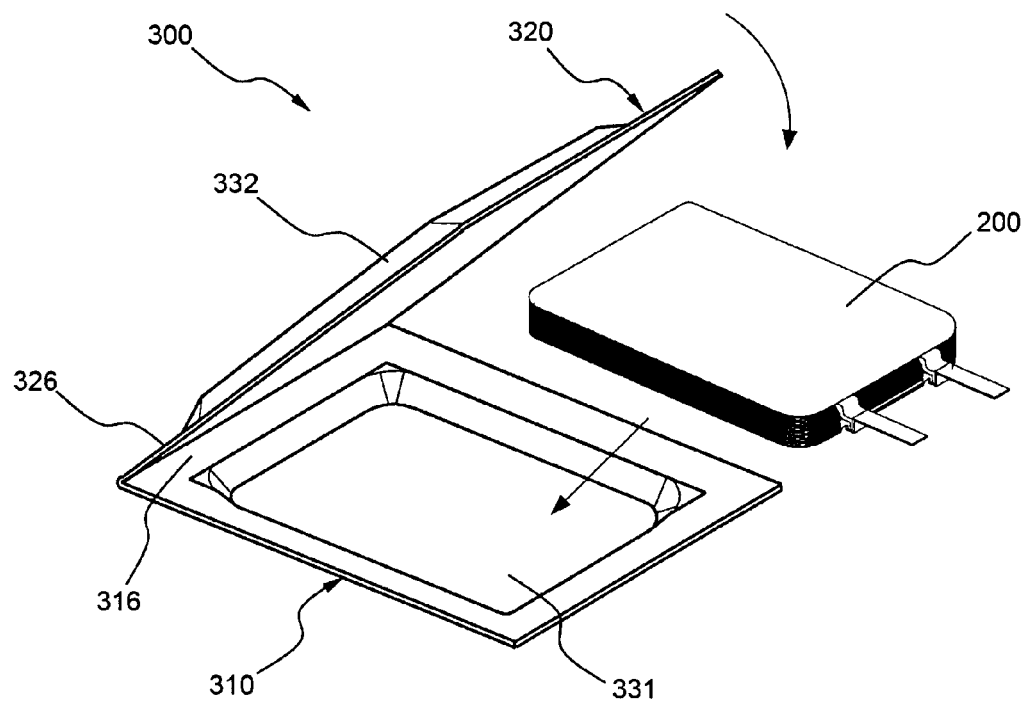
FIGS. 14 and 15 are schematic views of the structure of a battery package in accordance with yet another embodiment of the present invention.
Figure 15:
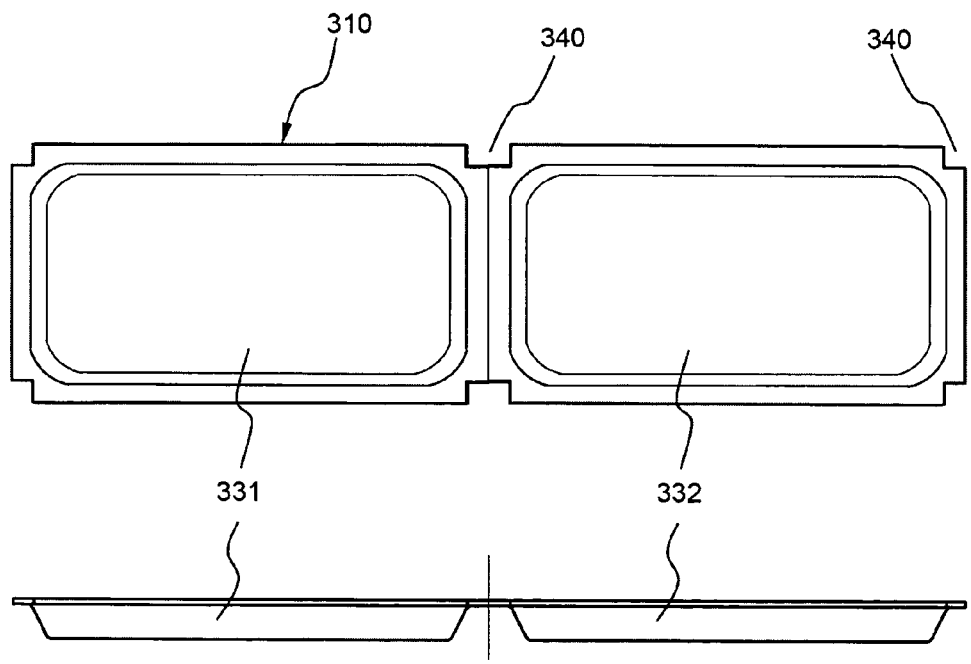

FIGS. 14 and 15 are schematic views of the structure of a battery package in accordance with yet another embodiment of the present invention.

Figure 6:
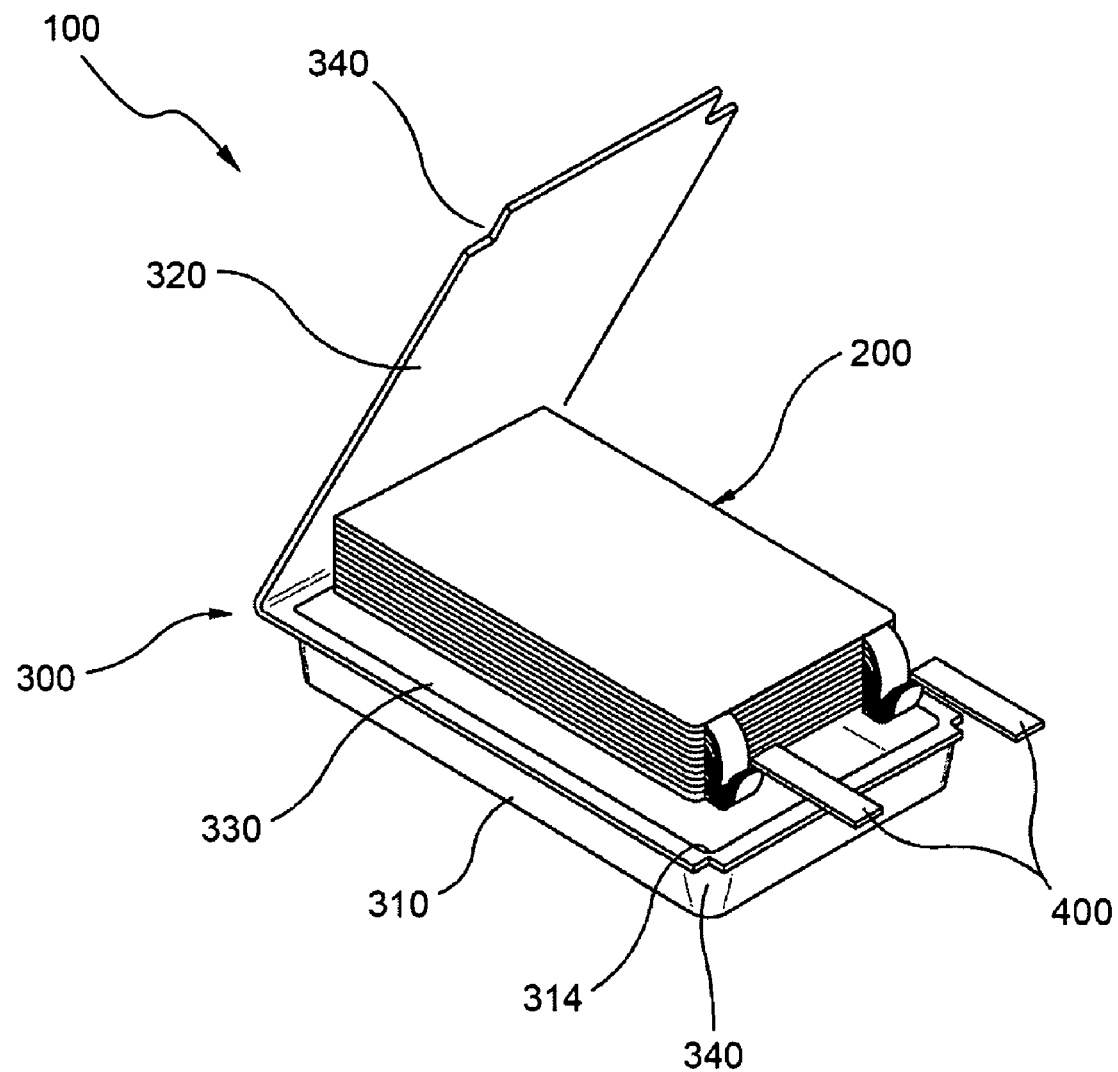
FIGS. 6 to 10 are schematic views of the structure of a battery package in accordance with one embodiment of the present invention.
Figure 7:
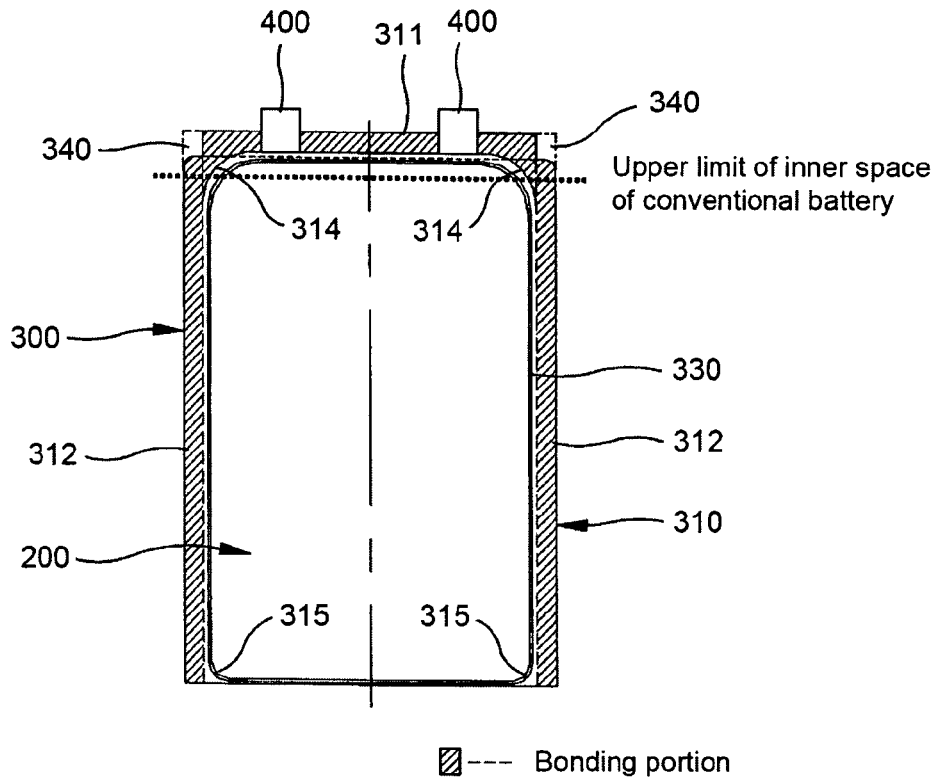
Figure 8:
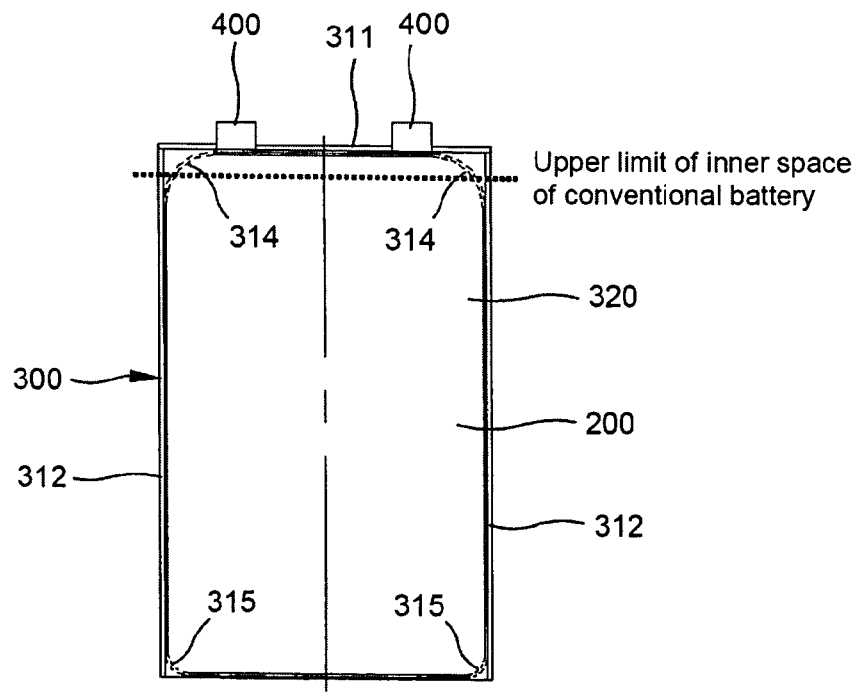
Figure 9:
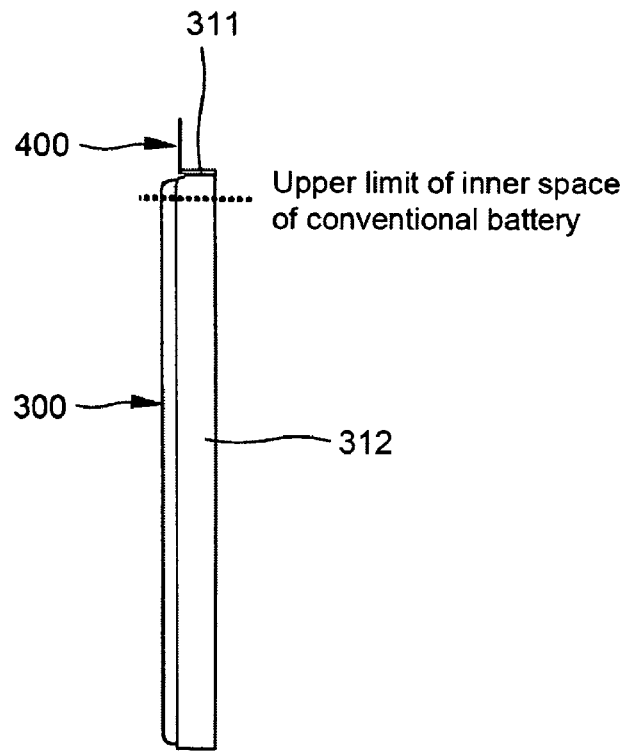
Figure 10:
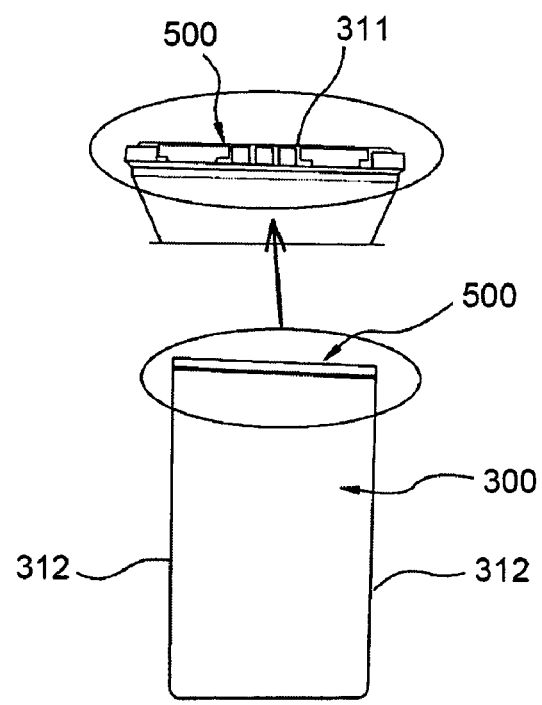

Referring to FIGS. 14 and 15, the battery case 300 of this embodiment is the same as the battery case 300 of the preceding embodiment as shown in FIG. 6 in that the lower end of the lower body 310 is formed integrally with the lower end of the upper body 320. However, the battery case 300 of this embodiment differs from the battery case 300 of the preceding embodiment as shown in FIG. 6 in that the receipt portions 331 and 332 are respectively formed in the lower body 310 and upper body 320 and the extended portions 316 and 326 are extended from the lower ends of the lower body 310 and the upper body 320. The receipt portions 331 and 332 may be formed in the lower body 310 and upper body 320 without the lower extended portions 316 and 326. However, in this case, the lower ends of the lower body 310 and the upper body 320 may be damaged during deep drawing. Accordingly, in order to safely perform the deep drawing, the lower extended portions 316 and 326 are preferably required.

FIG. 15 illustrate plan and side views of the battery case 300 before the electrode assembly is sealed in the battery case 300. Here, the common portions placed at both sides of upper and lower ends of the battery case 300 are already cut off.

The battery package of the present invention is not limited to the above-described structures as shown in FIGS. 6 to 15, but may have other various structures.

As apparent from the above description, the present invention provides a structure of a battery package, in which the lengths of a receipt portion of a battery case and an electrode assembly placed in the receipt portion are increased in proportion to the width occupied by an upper bonding portion of the battery case in the longitudinal direction of the battery case, thereby increasing the power storage capacity and output thereof at the same size of the battery package. In case where receipt portions are respectively formed in upper and lower bodies of the battery case, the battery maximizes the power storage capacity and output thereof.

Further, an upper bonding portion of the battery case is easily folded toward the upper end of the battery case by cutting off common portions of the upper bonding portion and both side portions of the battery case. Furthermore, since both protruding sides of the upper bonding portion are rounded, the battery of the present invention prevents a worker from being injured by the protruded sides of the upper bonding portion when the worker handles the battery.

In addition, since inner corners corresponding common portions where the upper bonding portion (or a lower bonding portion) meets with both side portions of the battery case have large radiuses of curvature, the inner corners provide a designated sealing capacity to maintain the inner pressure of the battery even after the common portions are cut off for easily folding the upper bonding portion toward the upper end of the battery case, thereby having designated sealing dimensions and being capable of withstanding the inner pressure of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery, comprising:
    an electrode assembly including anode plates, cathode plates, and separators; and
    a battery case having first and second side bonding portions and an upper bonding portion coupled to the first and second bonding portions, the first and second bonding portions configured to be folded toward first and second sides, respectively, of the battery case, for accommodating the electrode assembly and a designated amount of electrolyte, and the electrode assembly being sealed such that two electrode terminals connected to corresponding electrode taps of the anode and cathode plates of the electrode assembly are exposed outside of the battery case, and
    common portions of the upper bonding portion and the first and second side portions of the battery case having removed portions to form first and second rectangular spaces thereon such that the upper bonding portion of the battery case is configured to be folded toward an upper end of the battery case, the two electrode terminals disposed on the upper bonding portion configured to be bent in a longitudinal direction of the battery case, and first and second inner corners of the upper bonding portion each have a first predetermined large radius of curvature such that the first and second inner corners do not extend to the first and second rectangular spaces, respectively,
    wherein a protection circuit is disposed on the upper end of the battery case, toward which the upper bonding portion is folded, such that a rear surface of the protection circuit contacts the upper end.

2. The battery as set forth in claim 1, wherein cut-offends of the common portions of the upper bonding portion and the first and second side portions of the battery case are rounded.

3. The battery as set forth in claim 1, wherein the electrode assembly is a laminated-type electrode assembly or a jelly rolled-type electrode assembly.

4. The battery as set forth in claim 1, wherein the ends of the electrode assembly have shapes corresponding to the radiuses of curvature of inner corners of the upper bonding portion.

5. The battery as set forth in claim 1, wherein the battery case has one structure selected from the group consisting of:
    (i) a structure, in which the lower end of an upper body is formed integrally with the lower end of a lower body, and a receipt portion is formed only in the lower body;
    (ii) a structure, in which an upper body and a lower body are separated from each other, and a receipt portion is formed in the lower body;

(iii) a structure, in which an upper body and a lower body are separated from each other, and receipt portions are respectively formed in the upper body and the lower body; and (iv) a structure, in which the lower end of an upper body is formed integrally with the lower end of a lower body, and receipt portions are respectively formed in the upper body and the lower body.

6. The battery as set forth in claim 5, wherein, when the upper and lower bodies are bonded to each other under the condition that the electrode assembly is placed in the upper and lower bodies of the battery case having one structure selected from the group consisting of (ii), (iii), and (iv), a sealing bonding portion is formed on the lower end of the battery case obtained by bonding the upper and lower bodies.

7. The battery as set forth in claim 5, wherein the battery case has one structure selected from the group consisting of (iii) and (iv).

8. The battery as set forth in claim 7, wherein the battery case has the structure of (iii).

* * * * *